US00RE38633E1

(19) United States
(12) Reissued Patent
Srinivasan

(10) Patent Number: US RE38,633 E
(45) Date of Reissued Patent: Oct. 19, 2004

(54) AUTOMATED, ELECTRONIC NETWORK BASED, PROJECT MANAGEMENT SERVER SYSTEM

(76) Inventor: Seshan R. Srinivasan, 1524 Condor Way, Sunnyvale, CA (US) 94087

(21) Appl. No.: 09/137,186

(22) Filed: Aug. 20, 1998

Related U.S. Patent Documents

Reissue of:
(64) Patent No.: 5,548,506
Issued: Aug. 20, 1996
Appl. No.: 08/210,172
Filed: May 17, 1994

(51) Int. Cl.[7] ..... G06F 17/30; G06F 17/50
(52) U.S. Cl. ..... 707/10; 707/9; 705/8; 709/219
(58) Field of Search ..... 705/8; 707/203, 707/10, 9; 700/95; 706/919; 709/201, 217, 218, 219, 206

(56) References Cited

U.S. PATENT DOCUMENTS

| | | | | |
|---|---|---|---|---|
| 4,451,067 A | * | 5/1984 | Williams | 281/31 |
| 4,809,170 A | | 2/1989 | Leblang et al. | 707/200 |
| 4,875,162 A | * | 10/1989 | Ferriter et al. | 705/8 |
| 5,168,444 A | * | 12/1992 | Cukor et al. | 705/8 |
| 5,255,181 A | * | 10/1993 | Chapman et al. | 705/8 |
| 5,301,270 A | | 4/1994 | Steinberg et al. | 345/326 |
| 5,381,332 A | * | 1/1995 | Wood | 705/8 |
| 5,530,861 A | | 6/1996 | Diamant et al. | 705/8 |

OTHER PUBLICATIONS

"Is Lotus Notes Groupware in your company's future: Lotus Notes 3.0," Michael miley MacWeek, vol. 7 issue 22, pp. 22–24, May 31, 1993.*

"Project Management Software That's IS Friendly", Lee, Datamation p. 55(4), Oct., 1993.*

"Syzygy: Aiding a Stellar of Resources" by Joseph Devlin, Personal Computing, v 14, n4, p. 152(1), Apr. 1990.*

(List continued on next page.)

*Primary Examiner*—Shahid Alam
(74) *Attorney, Agent, or Firm*—Frederic W. Neitzke, Esq.

(57) ABSTRACT

Design and implementation of an 'Auto Multi-Project Server System', which automates the tasks of Project Management Coordination, for organizational work-group team members. The 'Auto Multi-Project Server', referred to as AMPS, consists of a core piece of software running on a host server computer system and interacting with a messaging system such as electronic mail, fax etc. Once the AMPS system is configured for the work environment, all interactions with it by work-group team members is via messages. First the AMPS system compiles multi-project plans into a multi-project database, and tracks the ownership of projects, tasks and resources within the plans. Second the AMPS system performs automatic checking of resource requests, if resource availability limits are exceeded then resources are re-allocated to projects based on priorities, and project plans are accordingly changed Third the database is processed periodically to send out reminder follow-ups and project status reports. Fourth the databases are continuously updated based on status changes reported by work-group members. These four steps are continuously repeated enabling an automated method of multi-project management for organizational work-group team members.

51 Claims, 10 Drawing Sheets

The 'Auto Multi-Project Management' Process

Objective: Architecture drawing to show the different components for implementing the automatic multi-project server, to use in an automatic multi-project management process.

OTHER PUBLICATIONS

"Groupware Rocks the Enterprize", by Mtch Irsfeld, Open Systems Today, p. 32(1), Aug. 1993.*

"Primavear Project Planner: Project Management Sortware", PC Magazine, p. 170(1), Aug. 1992.*

"High–End Project Manager Coordinate Enterprisewide Project with Desktop Flexibility," Heck, Mike, InfoWorld, v15, n5, p. 59(9), Feb. 1993.*

"Software Review—Primavera Project Planner 5.0," by Jay Medlock, Cost Engineering, v34, n8, p. 25 (2), Aug. 1992.*

Microsoft7 Project 4.0, including Microsoft7 Project Workgroup Extensions and Project Scheduler Template, Feb., 1994.

Richard E. Westney, Computerized Management of Multiple Small Projects (1992).

1992David King, Project Management Made Simple (1992).

Steve Gilliland, Project Managers: Upping the Organization, PC Sources, v. 3, n. 12, Dec. 1992.

TeamEffort by Saratoga Software, Inc. Aug., 1990.

Anthony Welsh, "Project Management In Action—The Future of project Management," May 1992.

InConcert version 2.5, Mar., 1993.

* cited by examiner

Fig 1. The 'Auto Multi-Project Management' Process
Objective: Architecture drawing to show the different components for implementing the automatic multi-project server, to use in an automatic multi-project management process.
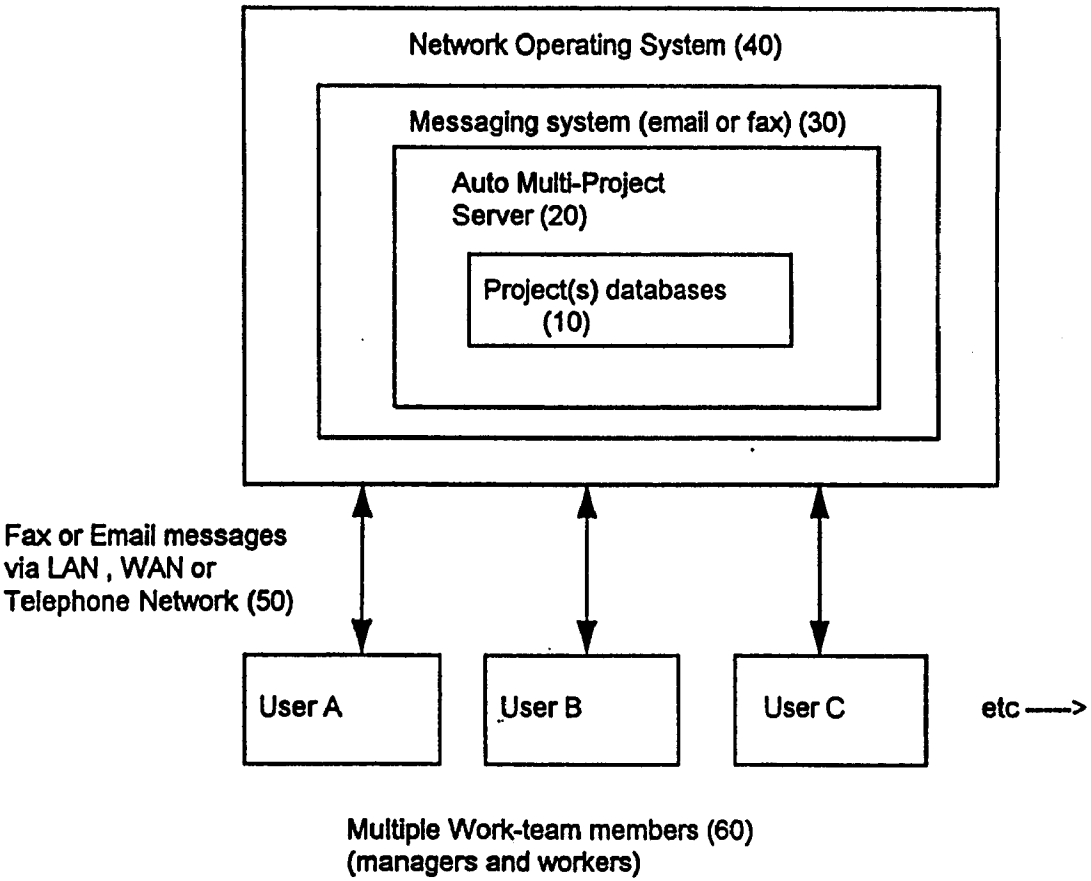

Fig 2 - Internal Architecture of the 'Auto Multi-Project Server'
Objective: Show the internal components of the 'Auto Multi-Project Server'.
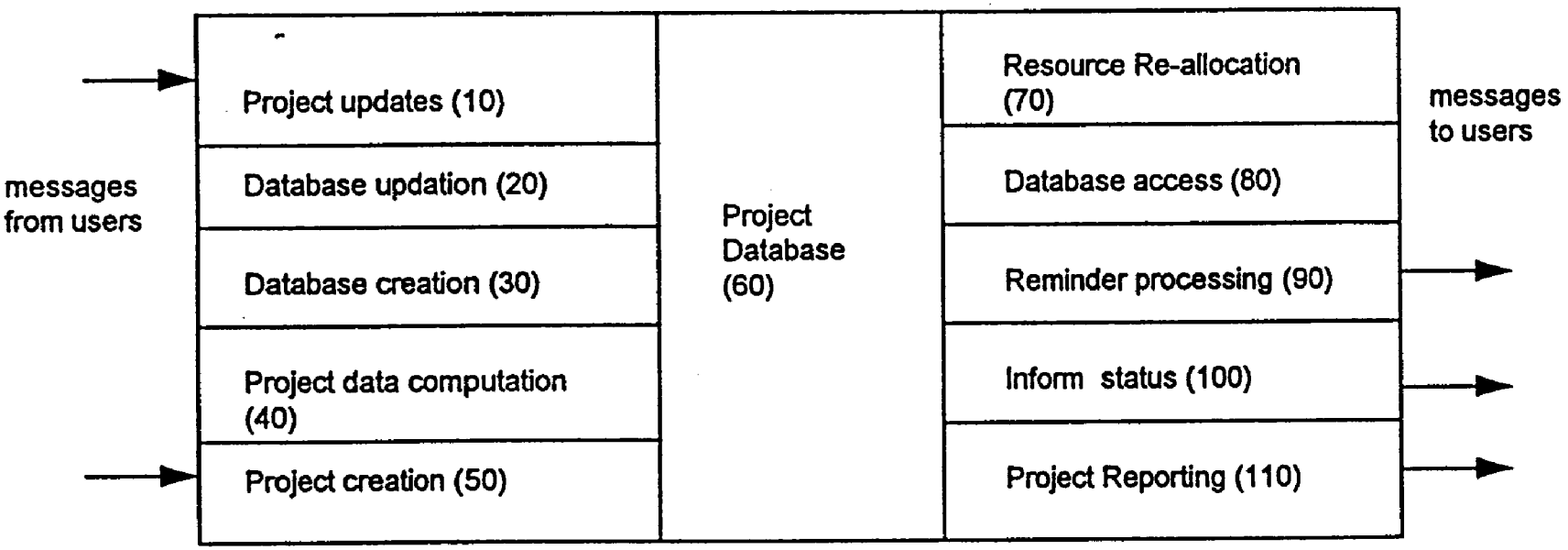

Fig 3 - Project database example

User Name > xxx
Password > 12345678

---

Project Description (1 line) > xxxxxx
Project Id No (upto 3 characters) >3456
Project Start Date (m/d/y) > 2/20/1994
Project Leader Name > Sesh Srinivasan
(optional) Project Leader Email Id > sesh@xyz.abc.com
(optional) Default Reminder Frequency (d,b,w,f,m) >
(Optional) Week-ends (sat,sun,mon,tue,wed,thu,fri) > sat sun
(optional) Holidays (m/d/y) >

---

Task Id (numbers only) >1
Task Description (1 line) > procure pipes
Task Status (pending/started/completed/stuck) > started
Task Leader Name > tl1
Task Leader Email Id > tl1@xxx.yyy.com
Task Duration (d,w,m or 0) > 3d
OR Task Completion Date (m/d/y) >
(optional) Task Reminder Frequency (d,b,w,f,m) >
(optional) Task Leader Can Change Schedule (y/n) > y
(optional) Parent Task Id >

---

Immediate Predecessor Task Id >
Dependency Type (fs,ff,ss) >
Time Lag (d,w,m) >

---

Resource name (include units) > Feet of copper pipes
Resource budget (numbers only)> 2000
Resource consumed > 500

---

Task Id (numbers only) >2
Task Description (1 line) >install pipes
Task Status (pending/started/completed/stuck) > pending
Task Leader Name > tl2
Task Leader Email Id > t12@abc.pqr.com
Task Duration (d,w,m or 0) > 1w
OR Task Completion Date (m/d/y) >
(optional) Task Reminder Frequency (d,b,w,f,m) >
(optional) Task Leader Can Change Schedule (y/n) > y
(optional) Parent Task Id >

---

Immediate Predecessor Task Id > 1
Dependency Type (fs,ff,ss) > fs
Time Lag (d,w,m) > 1d

---

Resource name (include units) > plumber man days
Resource budget (numbers only) > 10
Resource consumed >

---

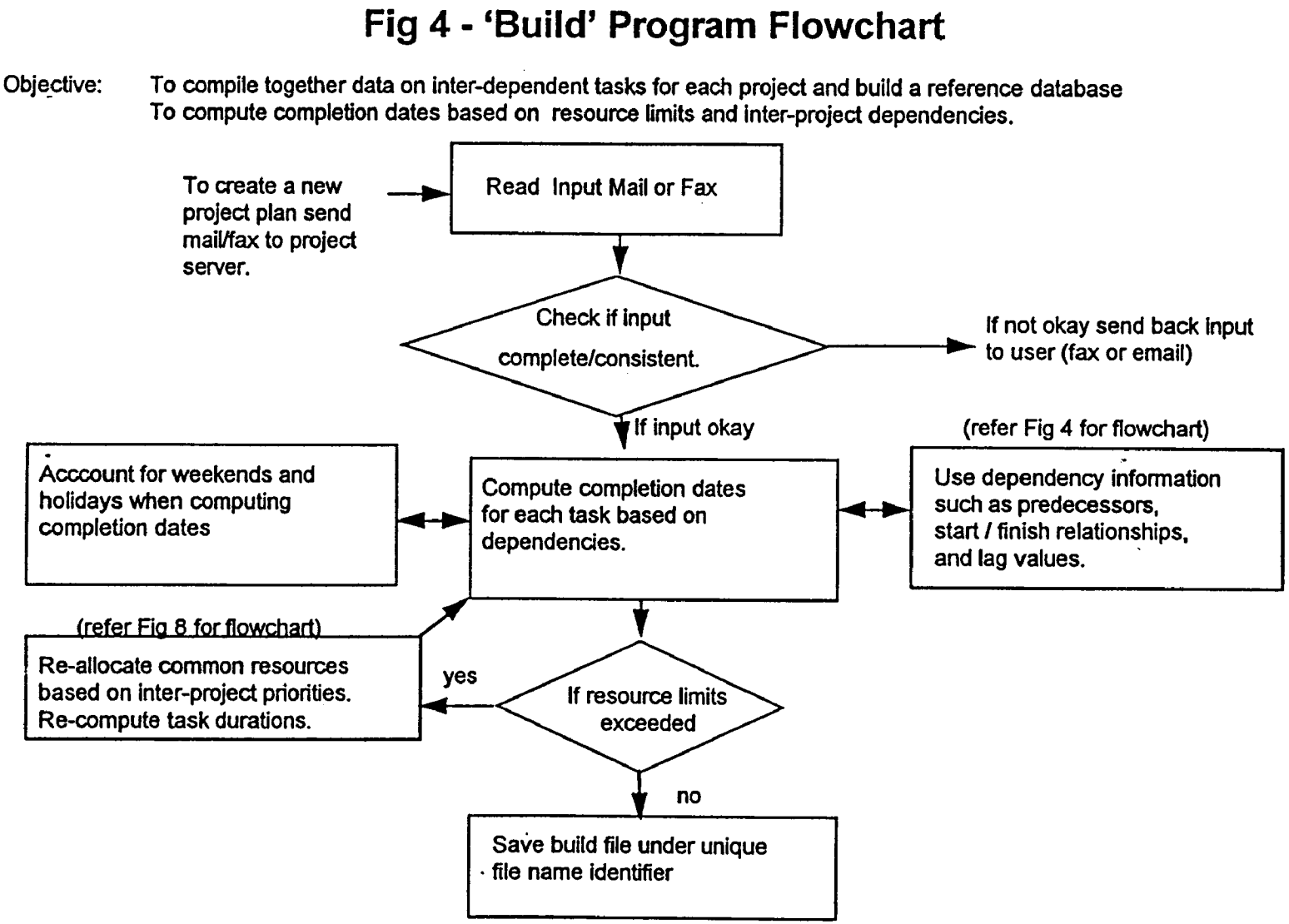
Fig 4 - 'Build' Program Flowchart
Objective: To compile together data on inter-dependent tasks for each project and build a reference database
To compute completion dates based on resource limits and inter-project dependencies.
To create a new project plan send mail/fax to project server.
Read Input Mail or Fax
Check if input complete/consistent.
If not okay send back input to user (fax or email)
If input okay
(refer Fig 4 for flowchart)
Use dependency information such as predecessors, start / finish relationships, and lag values.
Compute completion dates for each task based on dependencies.
Account for weekends and holidays when computing completion dates
If resource limits exceeded
yes
(refer Fig 8 for flowchart)
Re-allocate common resources based on inter-project priorities. Re-compute task durations.
no
Save build file under unique file name identifier

Fig 5 - Dependency Computation Flowchart
Objective: To compute task start and finish dates, based on relationship to dependent predecessors.
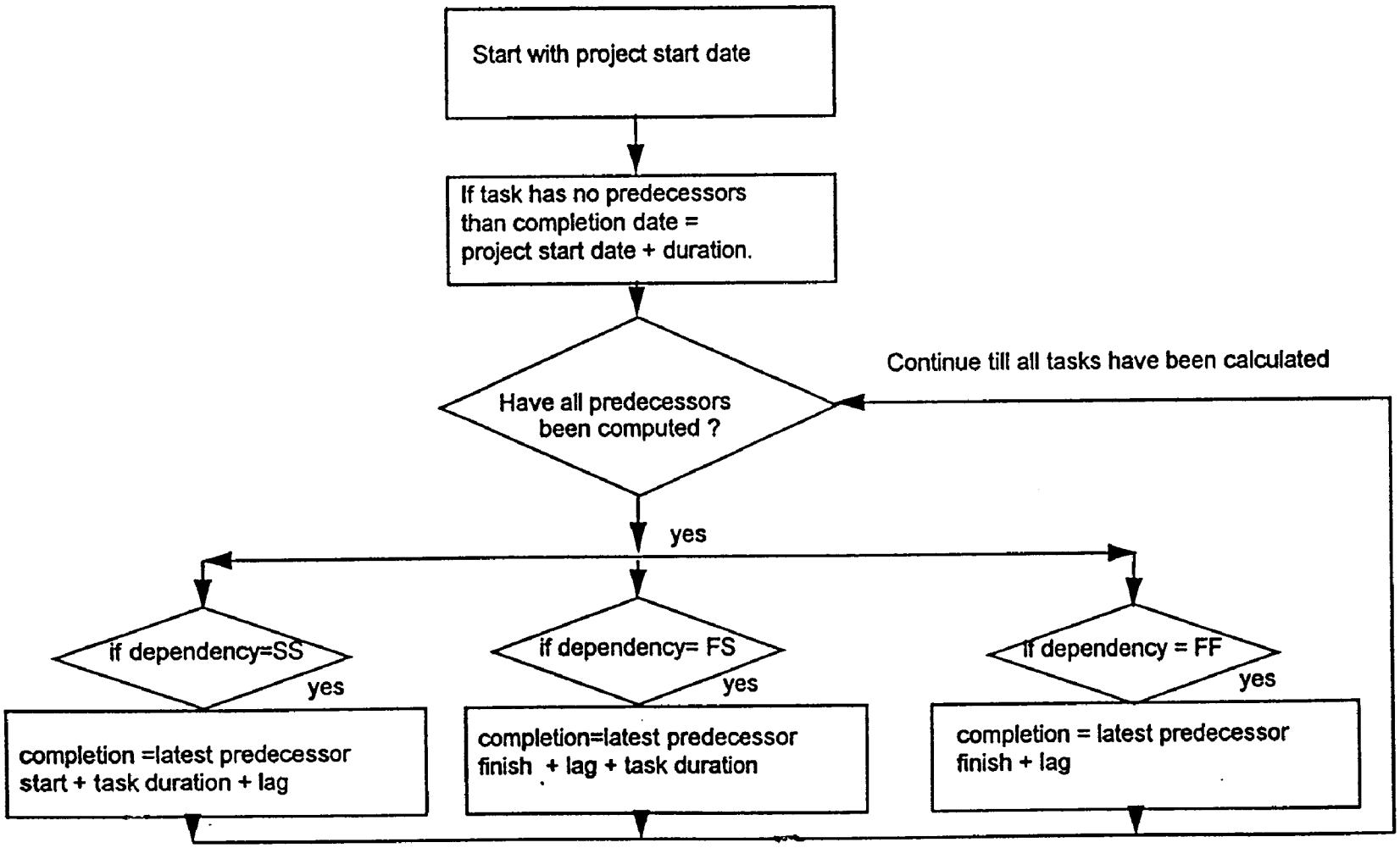

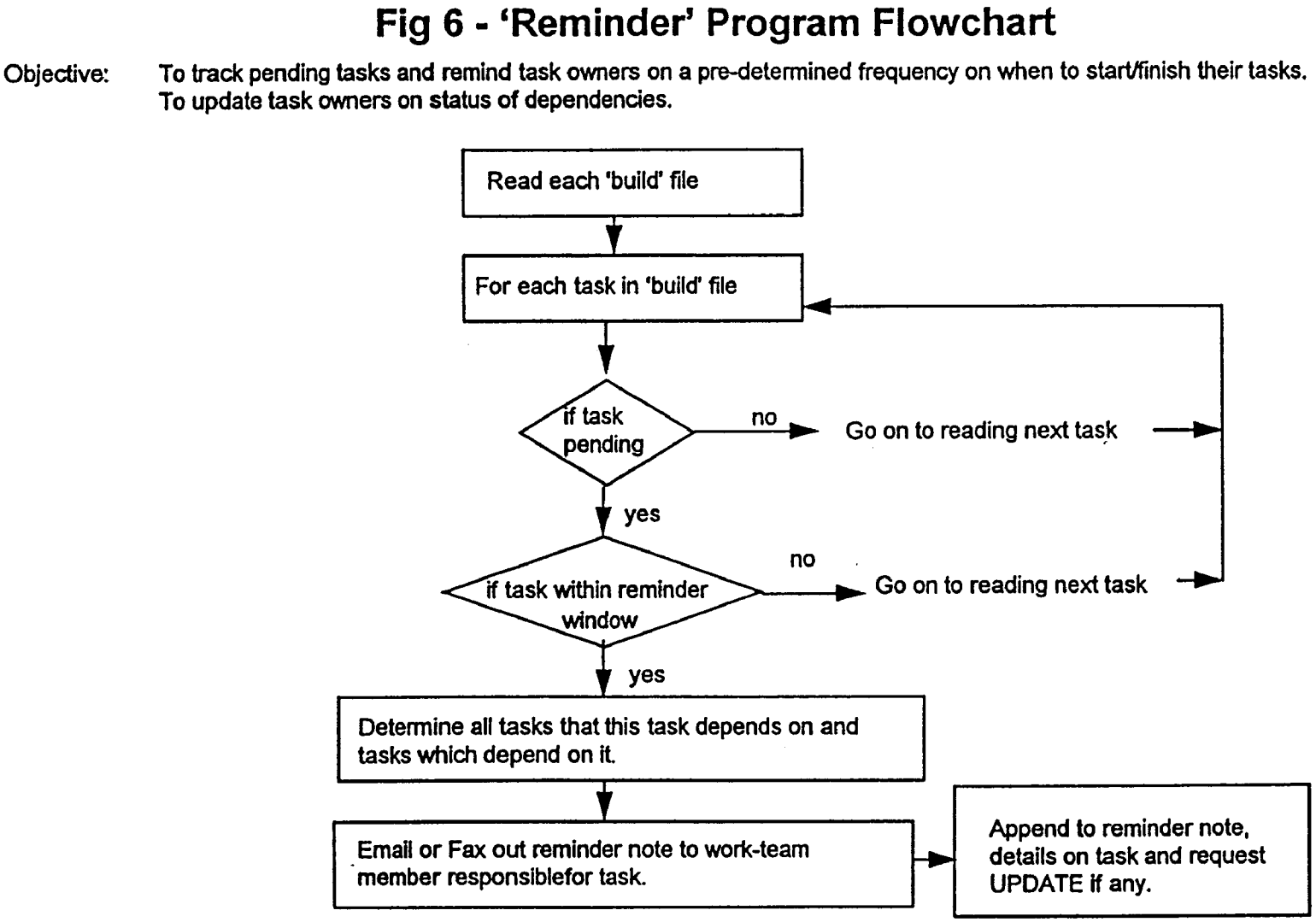
Fig 6 - 'Reminder' Program Flowchart
Objective: To track pending tasks and remind task owners on a pre-determined frequency on when to start/finish their tasks. To update task owners on status of dependencies.

Fig 7 - 'Inform' Flowchart
Objective : To track task completions and inform dependent tasks on start or finish status of their redecessors, thus to act as a formal channel of communication eliminating the chance of mis-information.
To inform project and task leaders on re-computed completion dates based on resource reallocation between projects.
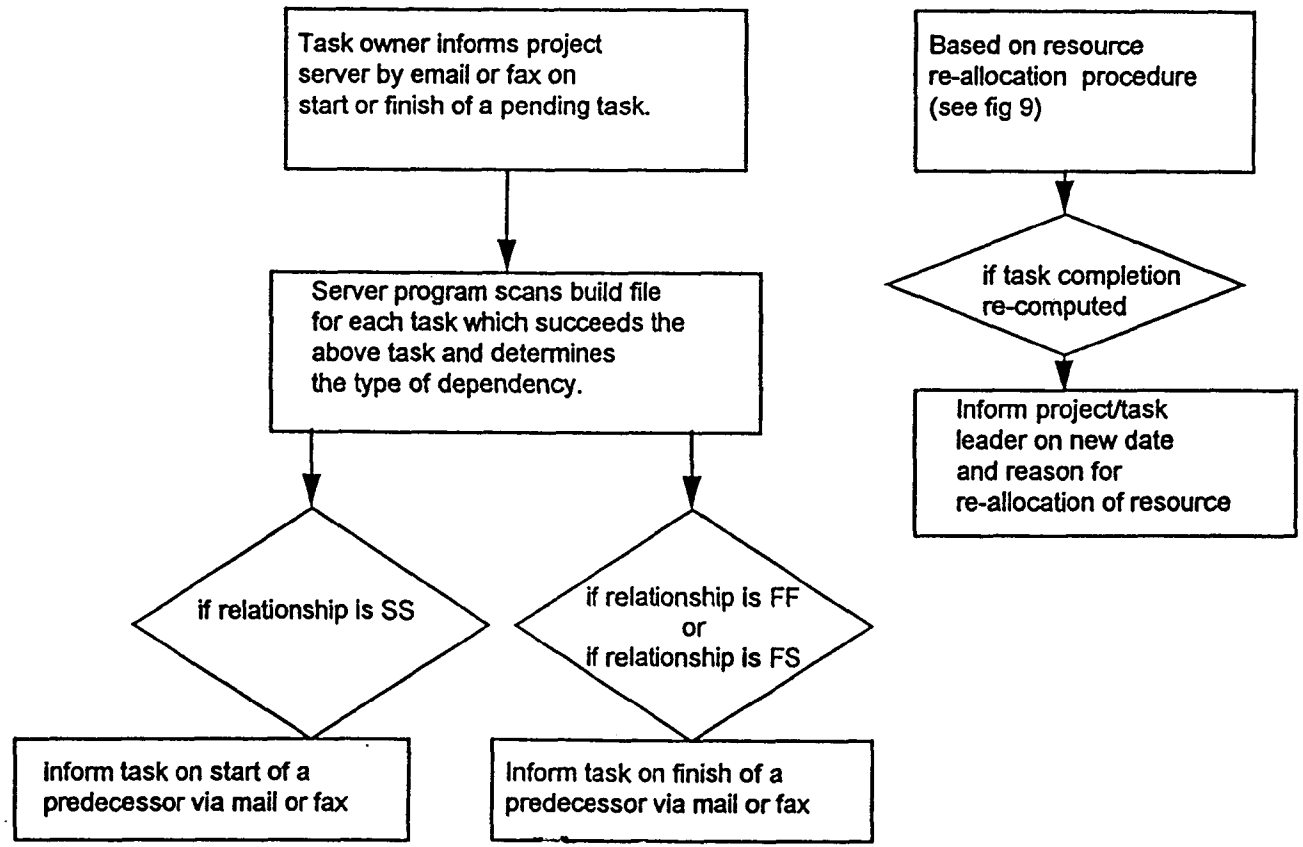

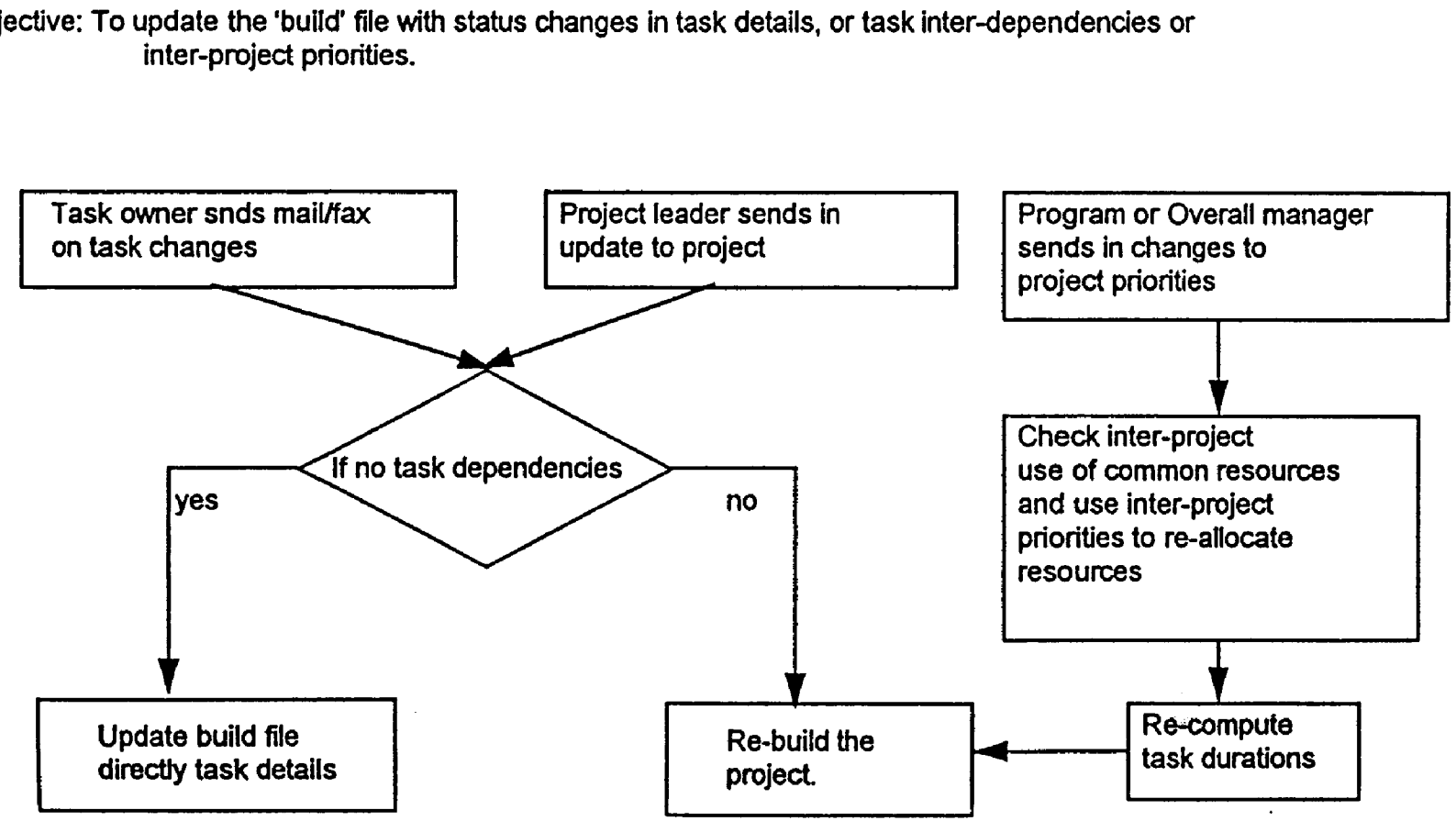
Fig 8 - 'Update' Flowchart
Objective: To update the 'build' file with status changes in task details, or task inter-dependencies or inter-project priorities.

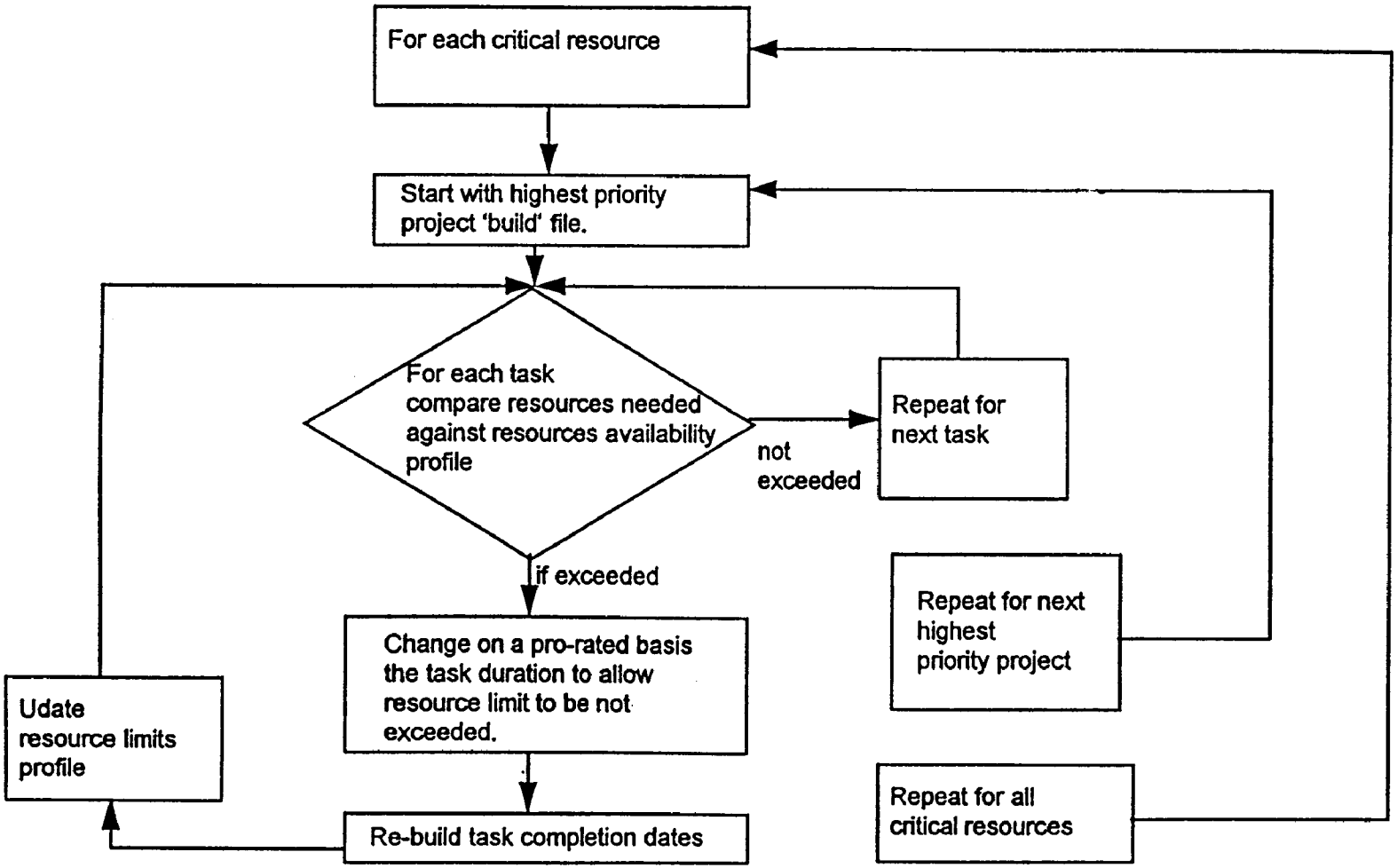
Fig 9 - Inter-project priorities and resource allocation flowchart
Objective: To allocate common resources based on inter-project priorities and re-compute task durations.

Fig 10 - 'Reports' Flowchart
Objective: To generate project management reports for reporting progress of project(s).
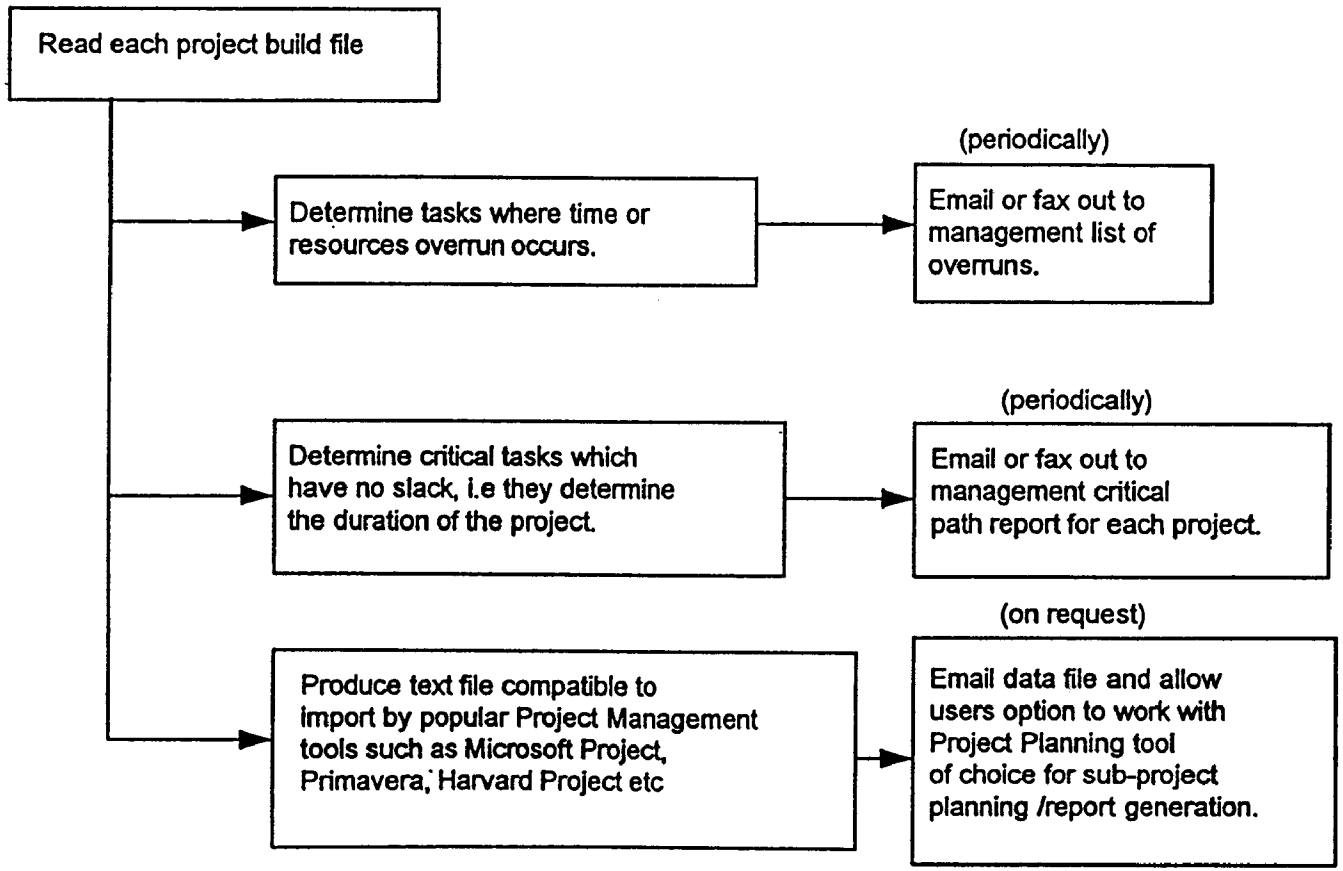

AUTOMATED, ELECTRONIC NETWORK BASED, PROJECT MANAGEMENT SERVER SYSTEM

Matter enclosed in heavy brackets [ ] appears in the original patent but forms no part of this reissue specification; matter printed in italics indicates the additions made by reissue.

BACKGROUND

1. Cross-references to Related Applications

A patent search revealed no patent under the categories, Automatic Project Management, or under Electronic Mail based Project Management or Groupware Project Management.

The category Project Management revealed two patents:

(1) U.S. Pat. No. 4,451,067, A Comprehensive Central Scheduling Folder for Project Management offers a non-computerized method for planning and tracking projects. This has no similarity with the proposed electronic network based project management system, as it does not involve computers.

(2) U.S. Pat. No. 4,875,162, An Automated Interface of Design Software with Project Management Software. The scope of this is narrow, focuses on design organizations only and involves automatic status update of files between design software and project Management software. This is not for general purpose management of multiple work-groups. Also it does not address the design of a general purpose auto-server for project management, which will perform automatic project database creation, project follow-up, multi-project resource planning and project reporting.

2. Field of Invention

The invention described here is the design and application of an electronic network based project management server system. The product termed in this application as an 'AUTO MULTI-PROJECT SERVER'. The use of the product will result in an improved organizational process for compiling, tracking and managing multiple projects within an organization.

The goal of the 'Auto Multi-Project Server' is to act as an automated computer based project coordinator to manage the goals of multiple organizational work-teams. Activities of the automated computer based server comprise of collating/compiling project data, flagging inconsistencies, follow-up with work-team members, obtain updated project tracking data, communicate project progress to work-team, resolve inter-project conflicts by re-allocation of critical resources based on project priorities and generate management reports for flagging time and cost overruns and critical path information.

Future re-engineered corporations will demand heavy computing needs for managing large number of work-teams with different project goals, schedules, dependencies and priorities running simultaneously. The present techniques for static project-management tools and for limited project-management groupware technologies will no longer be adequate.

3. Discussion of Prior Art

Presently the following types of project management systems are available:

1. Project planning tools, with software for generating charts such as Gantt, Pert/CPM etc. Many of the techniques were invented during the Second World War Majority of project management is perceived as belonging to this area. These are static standalone tools and do not impose any particular process in the organization. Organizations have to figure out methods for input, tracking and report distribution. Typically a project coordinator is hired by organizations to manually compile input data, run the tools and distribute progress reports.

Examples: Commercial tools such as PRIMAVERA and MICROSOFT-PROJECT offer computerized static software approach to planning projects, i.e. a person has to supervise the input data collection and output report generation, and there is no automatic process specified by the manufacturer.

A survey of existing project management tools showed no use of electronic mail or faxing methods to do any automatic creation, updating, planning or reporting. (Reference: DATAMATION—Oct. 1, 1993, Article: Project Management Software that's IS friendly, has a survey of the capabilities of Project Management tools and there is no mention of any automatic server based tools, driven by electronic messaging.)

2. Group collaboration and Work flow management tools, provide technologies to automate the flow of documents. These are directed at a wide variety of needs such as facilitating group conferences, meetings' management, project database management, information flow control and other custom mail enabled applications. The tools by themselves do not impose any organizational process, but offer an underlying technology to build applications, including the design proposed by this patent.

Example (1): U.S. Pat. No. 5,168,444 for a Work-flow shipment system, including processing of document images. This is not related to automatic project management for multiple work-groups.

Example (2) Lotus NOTES is a leading groupware product offering the necessary technology to build organizational processes including Project Tracking examples. The system is not designed to handle large multi-project/multi-priority environments. There is no automatic system proposed by the manufacturer and it is left for each organization to design its own process or system of project management.

Example (3) The nearest commercial product design is a product called SYZYGY from Information Research Corp., which builds on inherent capability of local area networks (LAN) to tie workers together. The system has a central database on organizational projects and can be automatically be programmed by managers to broadcast reminder messages. (Reference: Personal Computing, Volume 14, Issue 4, Date: Apr. 27, 1990, Page: 152), The differences I see between this product and the invention under this patent:

Syzygy is not ideal for managing large or complex projects since it lacks critical path analysis. The invention under this patent includes a complete computation engine for computing critical path activities, Syzygy does not do complex inter-task dependency computations.

Syzygy is not targeted for multiple work-teams with inter-conflicting priorities.

Syzygy does not attempt any resources leveling or resource re-allocation.

Objects and Advantages

The product in this patent application the 'Auto Multi-Project Server' consists of a centralized automatic project management server software, based in a computer and accessible via electronic mail or fax messages.

No Programming is involved by people using the system, the 'Auto Multi-Project Server' automatically computes task completion/start dates and triggers messages based on data mailed to it. Thus the data itself is used to program the 'Auto Multi-Project Server'.

The 'Auto Multi-Project Server' reads electronic mail or fax messages, such as project plans and flags project data inconsistencies. It then compiles project management data into a usable project database with information to include details on goals, milestones, budgets etc.

The 'Auto Multi-Project Server' follows-up with task leaders on pending tasks by reminding them on task start and finish dates The 'Auto Multi-Project Server' includes extensive dependency calculations, such as taking into account complex inter-task dependencies and start/finish lags between dependent activities.

The 'Auto Multi-Project Server' goes beyond just reminding people about their start and finish dates, it also serves as a project information system by informing the group team members on their inter-dependencies.

The 'Auto Multi-Project Server' includes resolution of multi-project priorities, which is an essential component for managing multi-groups with divergent priorities. It allows for example a program or general manager to examine multiple-projects under his program and assign priorities for completion. Individual task deadlines and resource usage would be controlled by the priorities assigned to the completion of the project.

The 'Auto Multi-Project Server' will re-allocate critical resources based on project priorities and re-compute completion dates. The project database would automatically be updated with the new dates. Thus there is automatic resolution of priority conflicts. The project leader does not have to have to constantly escalate issues up the management hierarchy for resolution.

Security issues are handled by the authorization of ell input mail or faxes, prior to processing. For electronic mail and faxes the incoming mail is checked against a valid list of passwords prior to processing. Also each project is assigned a unique identifier to prevent mix-up of information between projects.

In summary the 'Auto Multi-Project Server' is a necessary requirement for the needs of future HORIZONTAL CORPORATIONS where the information to manage multiple projects will be too complex to be done via manual present-day tools.

Further objects and advantages of my invention will become apparent from a consideration of the drawings and ensuing description.

DESCRIPTION OF DRAWINGS

FIG. 1—Architecture drawing to show the different components of an 'Auto Multi-Project Management Process', which is required for implementing the 'Auto Multi-Project Server'.

FIG. 2—Internal architecture of the 'Auto Multi-Project Server'.

FIG. 3—Project database example, format to serve as the primary communication and storage format for information on the different project(s).

FIG. 4—Build Program Flowchart, to compile together data on inter-dependent tasks for each project and build a reference database (with all necessary project information). To compute completion dates based on resource limits and inter-project dependencies.

FIG. 5—Dependency computation flowchart, to compute task start and finish dates based on relationship to dependent predecessors.

FIG. 6—Reminder program flowchart, to track pending tasks and remind task owners on a pre-determined frequency on when to start/finish tasks. To update task owners on status of dependencies.

FIG. 7—Inform flowchart, to track task completion and inform dependent tasks on start or finish status of their predecessors, thus acting as a formal channel of communication eliminating the chance of misinformation. Also to inform project and task leaders on re-computed completion dates based on resource re-allocation between projects (based on project priorities).

FIG. 8—Update flowchart, to update the 'build' file with status changes in task details or task inter-dependencies or inter-project priorities.

FIG. 9—Inter-project priorities and resource allocation flowchart. To allocate common resources based on inter-project priorities and re-compute task duration.

FIG. 10—Reports flowchart, to generate project management reports for reporting progress of projects(s).

LIST OF REFERENCE NUMERALS

FIG. 1

10 Project(s) databases, contains information on the project, also referred to as the 'BUILD' file. Format for this file is shown in FIG. 3.

20 Auto project management server. This software system is the heart of the process and its workings are explained in the flowcharts contained in FIG. 4 through FIG. 10.

30 Messaging system such as Fax or Email (Electronic Mail)

40 Network Operating System, is a general term used to refer to the communication protocol used to allow users communicate with the 'Auto Project Server'.

50 Fax, LAN (local area network), WAN (wide area network) or telephone network is the media for communication.

60 Work-team members communicating to the 'Auto Multi-Project Server', these may be program managers, project leaders, task leaders etc.

FIG. 2

10 Project updates, module to parse and read project updates,

20 Database updating, module to update the project database with new information.

30 Database creation, module to open a new database project file.

40 Project data computation, module to compute all project data, (Dates etc.)

50 Project creation, module to parse and read in project data on new projects.

60 Project database, centralized complete information on the project.

70 Resource re-allocation, re-assigns critical resources if limit exceeded.

80 Database access, to retrieve task information from project database.

90 Reminder processing, to send out reminders to pending task owners.

100 Inform status, to communicate status of dependencies.

110 Project reporting, to generate and send out project progress reports.

SUMMARY

The design and implementation of an 'Auto Multi-Project Server' for Automatic Multiple Project Management is described in this patent. This involves a self-running software system running on a central server computer system with capabilities for automatic data compilation, tracking and management, handle multiple projects, resolve inter-project resource conflicts and communicate with users via electronic mail or fax mail.

DESCRIPTION OF INVENTION

FIG. 1 shows the overall process of using the invention in an organization to manage multiple projects vi an automatic computer server. FIG. 2 shows the internal architecture of the invention which is an 'Auto Multi-Project Server'.

FIG. 1, Part 10—refers to the set of project database files stored, one for each project. These files are also referred to as the 'build' file. Refer FIG. 3 for a sample format. This file contains information about the project, such as the start date and other global information such as the project leader's name, mail identity, holidays, weekends etc. It also contains detailed information about each task such as the description, task leader's name/mail identity, task duration or planned completion date. In addition it contains information about the dependencies for each task, in terms of the predecessor task id, the type of dependency whether FS(predeceseor finishes and task starts), FF(predecessor and task finish together) or SS (predecessor and task start together), and the lag between the predecessor and task activities. Finally the database contains information about which resources, amount of resources and budget for resources required for doing the task.

FIG. 1, Part 20 is the 'Auto Multiple Project Server'. This is a software system which is the head of the new process. Details of its internal architecture are contained in FIG. 2. Its workings are explained in the flowcharts contained in FIG. 4 through FIG. 10. The server is a software process that runs at fixed intervals (example: at the end of the day) and performs the task of project management coordination by performing date compilation, data validation, database update, follow-up reminders to task leaders, inter-project resource conflict resolution and allocation and management reports generation on critical tasks and overruns. The main modules of the server software are described below:

Creation functions consisting of:

- Project creation module to read and check for consistency, project data on new projects. (Component 50, FIG. 2)
- Data computation module, to compute completion dates for all activities in the project based on dependency information and project start date. (Component 40, FIG. 2)
- Database creation, this module creates a new database project file. (Component 30, FIG. 2).
- Project database, holds centralized complete information on the project. (Component 60, FIG. 2).

Conflict-resolution functions consisting of:

- 'Resource' module, to check for resource usage and to re-allocate resources on the basis of inter-project priorities, if resource are limits exceeded. Project database has to be re-created if resources are re-allocated. (Component 70, FIG. 2).

Updating functions consisting of:

- 'Project Update' module, to receive and parse updates from project/task leaders (Component 10, FIG. 2)
- Database updating, module to update the project database with new project status information.(Component 20, FIG. 2).

Information functions consisting of:

- Database access, to retrieve task information from project database. (Component 80, FIG. 2).
- 'Remind' module, to send auto reminders to task leaders of pending tasks. (Component 90, FIG. 2).
- 'Inform' module, to inform task leaders on completion of dependent activities. (Component 100, FIG. 2)
- Project reporting, to generate and send out project progress reports. (Component 110, FIG. 2)

The server software system has been implemented in C language, making it easier to port to different machines and also providing the necessary performance for handling the largest projects. The server system has to work closely with the Messaging system and the Network Operating System, the components of which are described below.

FIG. 1, Part 30—Messaging system is used to refer to the communication protocol used to allow users communicate with the 'Auto Multi-Project Server'. This has to work under and is closely related to FIG. 1, Part 40 which is the Network Operating System. The network operating system controls the network operation.

The 'Auto Multi-Project Server' has to be configured separately for each type of messaging system/network operating system. The following are some of the example environments, they are provided for clarity and do not exclude other environments:

- UNIX mail system running under a UNIX server machine such as a 486 PC, PENTIUM PC, SUN Workstation, DEC workstation, IBM RS6000 workstation etc. and communicating to other machines via an electronic network (Part 40). Users send electronic mail to the server machine on new project information and status updates, which is processed by the 'Auto Multi-Project Server'. The 'Auto Multi-Project Server' in turn sends back electronic mail reminders and management reports.
- Mail system running on a network of PCs'. The mail system may be LOTUS CCMAIL or LOTUS NOTES or MICROSOFT MAIL etc. The Network Operating System may be NOVELL NETWARE or VINES or PC-NFS etc.
- Fax based communication system, based on fax board inside PC coupled with OCR software to read fax messages. Here the fax board and software functions as the messaging system, as well as the network operating system. The fax system must have automatic transmission, automatic receipt and optical character recognition capability.

FIG. 1, Part 50 is the communication network, which may be Fax, LAN (local area network), WAN (wide area network) or telephone network is the physical media for communication. This is generally transparent for the 'Auto Multi-Project Server', as it is handled by the Network Operating System (Part 40).

FIG. 1, Part 60 are the different Project Work-team members communicating to the 'Auto Multi-Project Server', these may be program managers, project leaders, task leaders etc. The program manager assigns inter-project priorities, the project leader creates the first plan for the project and the task leaders update the project database with progress of project.

Operation of Invention

The 'Auto Multi-Project Server' is designed to change the organization process of planning, tracking and management of work-team projects. The entire process is planned to be automated with managers focusing only on the exceptions and crisis situations. I describe below the process of using the 'Auto Multi-Project Server', as well as the logic used by the Invention to manage projects.

Step 1—Set up the environment, this involves creating an environment configuration file with an entry in it to show the command string to be used in submitting an input file for electronic mail or for faxing it out. Also the command string to be used in reading an electronic mail or fax, and the input file name. The environment file is also used to indicate week-ends, holidays and default reminder frequency and default reminder window.

In addition a separate file containing authorization information is required for 'project leaders to allow them to create new projects. The authorization will consist of a list of 'user names' and valid passwords'.

The above environment configuration files are the only manual operation and is a one time operation. These can be performed by a Systems Manager, who does not require to have any knowledge of 'Project management processes'. Based on the configuration values the appropriate communication procedures are invoked.

Step 2—The project leader creates a project plan in the format as per FIG. 3. This has information on the project, tasks, dependencies and resources to be used.

Step 3—The 'Auto Multi-Project Server' reads the project plan and invokes the 'Build' Procedure as per flowchart in FIG. 4. The first step is to validate the user/password and then parse the input for errors such as if names, descriptions, mail ids etc. are missing. Based on dependencies, the server computes the completion dates for each task. Completion dates are based on work-days only, so the software accounts for week-ends and holidays. Refer FIG. 5—Dependency Computation Flowchart for details on how dependencies are handled.

Step 4—Resolving Inter-project resource conflicts. The 'build' procedure is not complete unless critical common resource usage has been compared against the resource limits. Refer FIG. 9 for the flowchart for the re-allocation of critical resources and the re-computing of completion dates.

Prior to this the Program Manager is mailed a list of projects and is requested to assign a rank priority. In addition the program manager is requested to supply a list of critical resources and their usage limits. The actual usage is compared against this limit.

Step 5—Task Reminders are accompanied by information about the task, to allow task leaders to provide change updates such as changes in the task duration or the estimated completion date or to inform on amount of resources actually consumed. Refer FIG. 8 for the procedure flowchart on updating the project database.

Step 6—The 'Inform' procedure is invoked each time there is a change in a dependent task status such as starting or completion. Refer FIG. 7 for the flowchart. Thus the 'Auto Multi-Project Server' serves also as a formal mode of communication of task status, and does not leave it to be communicated via other informal means.

Step 7—The 'Reports' procedure shown in FIG. 10, is invoked to generate the necessary management reports on time/cost overruns and critical path analysis. In addition managers are informed on re-allocation of any resources, to explain re-computation of completion dates.

Automatic Operation—It should be noted that the operations of the 'Auto Multi-Project Server' are automatic (or self-running) and there is no manual intervention. Only at the staff-up stage is there any manual customization of the environment, by changing some of the program variables and setting up the environment file. In general the operation is driven by mail messages received from users. The 'Auto Multi-Project Server' responds to the messages and is thus 'event driven', though the response does not occur immediately but rather batched together for the end of day processing, as explained in the next paragraph.

Night processing—It is suggested that given the heavy amount of processing for each project, all 'build', 'reminder', 'inform', 'reports', 'resource re-allocation' procedures be run at night. This will allow for lowered load on the server and also allow accumulation of all status updates to be handled together eliminating database file access problems. Real time response to user messages is not necessary.

Summary, Ramifications and Scope

I have described so far the architecture and working of an 'Auto Multi-Project Server' which is necessary to implement the proposed 'Automatic Multiple Project Management Process'. As can be seen from the product description and operation so far, the 'Auto Multi-Project Server' is a first of its kind product with some very unique features to handle large and multiple number of projects, including where there are resource conflicts. The future organizations will be greatly demanding in terms of number end size of projects and only an automated software system can prove to be useful. Existing static tools will be overwhelmed by the amount of project data.

What is claimed as the invention is:

1. A method executed by a computer system as part of a computer program, said system for coordinating the management of a project, said computer system to comprise of a central database server connected to a electronic network, said method using a two way electronic messaging system that allows different types of organizational work-group team members to send messages to the computer program and receive messages from the computer program via the said electronic network, said method storing and accessing data from a multi-project database, said method to be automatic in nature and with built in triggers which are based on the nature and status of said data without need for manual project management coordination, said project management coordination to involve all the steps of the project management cycle including planning, resource leveling, status reporting and reminding, tracking and updating plans, said method to be configurable for the said organizational work-group environment, said method comprising the steps of:

(a) identifying the owner of received message;

(b) identifying the nature of said received message;

(c) setting up said multi-project database and saving said received messages to said database according to the nature of said received message;

(d) receiving project plans and compiling project plans and saving project plans into said multi-project database;

(e) checking said project plans for resource requests against resource availability and reallocating resources if necessary based on inter-project priorities;

(f) recalculating and sending back said project plans based on resource reallocation;

(g) sending project status reports and reminders to organizational work-group team members based on the status of said triggers;

(h) receiving project updates and status changes and updating said project database;

(i) repeating steps (a) through (h) on a periodic basis, as desired by said organizational work-group team members.

2. A method as claimed in claim 1 wherein said identifying the owner of the message step additionally comprises the step of identifying the incoming user messages and authorizing them against a valid list of users.

3. A method as claimed in claim 1 wherein said identifying the nature of the message step additionally comprises the step of checking the consistency of data sent to it via user messages, prior to processing the messages; has means to reject and return user messages which are inconsistent.

4. A method as claimed in claim 1 wherein said compiling project plans step additionally comprises the step of computing task completion dates based on project start date and inter-dependencies among tasks.

5. A method as claimed in claim 1 wherein said saving project plans step additionally comprises the step of creating a project database of information on the project, with all necessary information for follow-up of progress and all necessary information for reporting progress.

6. A method as claimed in claim 1 wherein said recalculating project plans based on resource reallocation step additionally comprises the step of recomputing task duration's and completion dates of tasks.

7. A method as claimed in claim 1 wherein said sending project status reports and reminders step additionally comprises the step of processing each project database and generating outgoing reminder messages for task leaders whose tasks are pending.

8. A method as claimed in claim 1 wherein said sending project status reports step additionally comprises the step for soliciting for updates to project and database status information.

9. A method as claimed in claim 1 wherein said sending project status reports step additionally comprises the step of sending messages to task leaders, on status of interdependent tasks.

*10. A method executed by a computer system as part of a computer program,*

*said system for coordinating the management of a project comprising at least one task,*

*said computer system comprising a central database server connected to an electronic network,*

*said method using a two-way electronic messaging system that allows organizational work-group team members to send messages to the computer program and receive messages from the computer program via said electronic network,*

*said method storing and accessing data from a project database,*

*said method further comprising built-in triggers which are based on the nature and status of said data without need for manual project management coordination,*

*said project management coordination to include planning, resource leveling, status reporting and reminding, tracking and updating plans, said method to be configurable for said organizational work-group environment, and*

*said method comprising:*

*(a) identifying the owner of a received message;*

*(b) identifying the nature of said received message;*

*(c) setting up said project database and saving said received messages to said project database according to the nature of said received message;*

*(d) receiving project plans and compiling project plans and saving project plans into said project database;*

*(e) checking said project plans for resource requests against resource availability and reallocating resources if necessary based on inter-task priorities;*

*(f) recalculating and sending back said project plans based on resource reallocation;*

*(g) sending project status reports and reminders to organizational work-group team members based on the status of said triggers;*

*(h) receiving project updates and status changes and updating said project database;*

*repeating steps (a) through (h) as desired by said organizational work-group team members.*

*11. An apparatus for coordinating the management of a project comprising at least one task,*

*said apparatus comprising a computer system including a computer program,*

*said computer system to comprise a central database server connected to an electronic network,*

*said apparatus using a two-way electronic messaging system that allows organization work-group team members to send messages to the computer program and receive messages from the computer program via said electronic network,*

*said apparatus storing and accessing data from a project database,*

*said apparatus including built-in triggers which are based on the nature and status of said data without need for manual project management coordination,*

*said project management coordination to include planning, resource leveling, status reporting and reminding, tracking and updating plans,*

*said apparatus to be configurable for said organizational work-group environment,*

*said apparatus comprising:*

*means for identifying an owner of a received message;*

*means for identifying the nature of said received message;*

*means for setting up said project database;*

*means for saving said received messages to said project database according to said nature of said received message;*

*means for receiving project plans;*

*means for compiling said received project plans;*

*means for saving said received project plans into said project database;*

*means for checking said project plans for resource requests against resource availability;*

*means for reallocating resources as necessary based on inter-task priorities;*

*means for recalculating said project plans based on resource reallocation;*

*means for sending project status reports to organizational work-group team members based on a status of said triggers;*

*means for receiving project status changes; and*

*means for updating said project database.*

*12. Apparatus that is automatic in nature and for coordinating management of a project, comprising:*

*an electronic messaging receiver module;*

*a project database including allocation of at least one resource between a plurality of project tasks; and*

*a resource leveling module with built-in triggers adapted to level allocation of said at least one resource between said plurality of project tasks in response to an electronic message received by said electronic messaging receiver.*

*13. The apparatus according to claim 12, wherein:*

*said electronic messaging receiver module is an E-mail receiver.*

*14. The apparatus according to claim 12 wherein:*

*said resource leveling module allocates said at least one resource in accordance with priorities assigned to each of said plurality of project tasks.*

*15. The apparatus according to claim 12, wherein:*

*said project database includes allocation of a plurality of resources; and*

*said project database is centrally accessible by electronic messaging from each of said plurality of resources.*

*16. The apparatus according to claim 12, wherein:*

*said resource leveling module is further adapted to identify inconsistencies in said allocation of said at least one resource between said plurality of project asks.*

*17. The apparatus according to claim 16, further comprising:*

*an electronic messaging transmitter module;*

*at least one work group member being notifiable by electronic messaging of said identified inconsistencies.*

*18. The apparatus according to claim 12, further comprising:*

*an electronic messaging transmitter module; and*

*a module adapted to notify at least one work group member of milestones for at least one of said plurality of project tasks by electronic messaging.*

*19. The apparatus according to claim 12, further comprising:*

*an electronic messaging transmitter module;*

*said resource leveling module being further adapted to report via electronic messaging interdependencies between said plurality of project tasks.*

*20. The apparatus according to claim 12, wherein:*

*said electronic message acted on by said apparatus is password protected.*

*21. The apparatus according to claim 12, wherein:*

*said resource leveling module is further adapted to resolve resource conflicts between said plurality of project tasks.*

*22. Apparatus that is automatic in nature and for coordinating multi-project management, comprising:*

*an electronic messaging receiver module;*

*a multi-project database including allocation of at least one resource between a plurality of projects; and*

*a resource-leveling module with built-in triggers adapted to level allocation of said at least one resource between said plurality of projects in response to an electronic messaging received by said electronic messaging receiver.*

*23. The apparatus according to claim 22, wherein:*

*said electronic messaging receiver module is an E-mail receiver.*

*24. The apparatus according to claim 22, wherein:*

*said resource leveling module allocates said at least one resource in accordance with priorities assigned to each of said plurality of projects.*

*25. The apparatus according to claim 22, wherein:*

*said multi-project database includes allocation of a plurality of resources; and*

*said multi-project database is centrally accessible by electronic messaging from each of said plurality of resources.*

*26. The apparatus according to claim 22, wherein:*

*said resource leveling module is further adapted to identify inconsistencies in said allocation of said at least one resource between said plurality of projects.*

*27. The apparatus according to claim 26, further comprising:*

*an electronic messaging transmitter module;*

*at least one work group member being notifiable by electronic messaging of said identified inconsistencies.*

*28. The apparatus according to claim 22, further comprising:*

*an electronic messaging transmitter module; and*

*a module adapted to notify at least one work group member of milestones for at least one of said plurality of projects by electronic messaging.*

*29. The apparatus according to claim 22, further comprising:*

*an electronic messaging transmitter module;*

*said resource leveling module being further adapted to report via electronic messaging interdependencies between said plurality of projects.*

*30. The apparatus according to claim 22, wherein:*

*said electronic message acted on by said apparatus is password protected.*

*31. The apparatus according to claim 22, wherein:*

*said resource leveling module is further adapted to resolve resource conflicts between said plurality of projects.*

*32. A method that is automatic in nature and for coordinating the management of a project, said method comprising:*

*receiving an electronic message;*

*allocating at least one resource between each of a plurality of project tasks represented in a common database, based on said received electronic message; and*

*leveling allocation of said at least one resource between said plurality of project tasks with built-in triggers in response to said received electronic message.*

*33. The method for coordinating management of a project according to claim 32, wherein:*

*said received electronic message is an E-mail message, and*

*said at least one resource comprises one of labor, equipment, and material.*

*34. The method for coordinating management of a project according to claim 32, wherein:*

*said at least one resource is leveled in accordance with priorities assigned to each of said plurality of project tasks.*

*35. The method for coordinating management of a project according to claim 32, wherein:*

*a plurality of resources are allocated between each of said plurality of project tasks; and*

*said common database is centrally accessible by electronic messaging from each of said plurality of resources.*

*36. The method for coordinating management of a project according to claim 32, further comprising:*

*identifying inconsistencies in said allocation of said at least one recourse between said plurality of project tasks included in said common database.*

*37. The method for coordinating management of a project according to claim 36, further comprising:*

*notifying at least one work group member of said identified inconsistencies by electronic messaging.*

*38. The method for coordinating management of a project according to claim 32, further comprising:*

*notifying by electronic messaging at least one work group member of milestones for said plurality of project tasks.*

*39. The method for coordinating management of a project according to claim 32, further comprising:*

*reporting via electronic messaging interdependencies between said plurality of project tasks.*

*40. The method for coordinating management of a project according to claim 32, wherein:*

*said received electronic message is password protected.*

*41. The method for coordinating management of a project according to claim 32, further comprising:*

*resolving resource conflicts between said plurality of project tasks.*

*42. A method that is automatic in nature and for coordinating multi-project management, said method comprising:*

*receiving an electronic message;*

*allocating at least one resource between each of a plurality of projects represented in a common database based on said received electronic message; and*

*leveling allocation of said at least one resource between said plurality of projects with built-in triggers in response to said received electronic message.*

*43. The method for coordinating multi-project management according to claim 42, wherein:*

*said received electronic message is an E-mail message.*

*44. The method for coordinating multi-project management according to claim 42, wherein:*

*said at least one resource is leveled in accordance with priorities assigned to individual tasks within each of said plurality of projects.*

*45. The method for coordinating multi-project management according to claim 42, wherein:*

*a plurality of resources are allocated between each of said plurality of projects; and*

*said common database is centrally accessible by electronic messaging from each of said plurality of resources.*

*46. The method for coordinating multi-project management according to claim 42, further comprising:*

*identifying inconsistencies in said allocation of said at least one resource between said plurality of projects included in said common database.*

*47. The method for coordinating multi-project management according to claim 46, further comprising:*

*notifying by electronic messaging at least one work group member of said identified inconsistencies.*

*48. The method for coordinating multi-project management according to claim 42, further comprising:*

*notifying by electronic messaging at least one work group member of milestones for said plurality of projects.*

*49. The method for coordinating multi-project management according to claim 42, further comprising:*

*reporting via electronic messaging interdependencies between said plurality projects.*

*50. The method for coordinating multi-project management according to claim 42, wherein:*

*said received electronic message is password protected.*

*51. The method for coordinating multi-project management according to claim 42, further comprising:*

*resolving resource conflicts between said plurality of projects.*

* * * * *